(12) United States Patent
Mackensen et al.

(10) Patent No.: US 8,262,128 B2
(45) Date of Patent: Sep. 11, 2012

(54) ADVANCED TAB LOCK ATTACHMENT FOR EMBLEM

(75) Inventors: Jürgen Mackensen, Dachau (DE); Raimund Nebel, Obermeitingen (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/996,667

(22) PCT Filed: Jun. 4, 2009

(86) PCT No.: PCT/EP2009/004026
§ 371 (c)(1),
(2), (4) Date: Jan. 12, 2011

(87) PCT Pub. No.: WO2009/146920
PCT Pub. Date: Dec. 10, 2009

(65) Prior Publication Data
US 2011/0140397 A1 Jun. 16, 2011

(30) Foreign Application Priority Data
Jun. 7, 2008 (DE) .......................... 10 2008 027 303

(51) Int. Cl.
*B60G 21/16* (2006.01)
(52) U.S. Cl. .................................................. 280/728.3
(58) Field of Classification Search ............... 280/728.3, 280/728.1
See application file for complete search history.

(56) References Cited

U.S. PATENT DOCUMENTS

| 1,727,026 A | 9/1929 | Cruver |
| 2005/0156409 A1 | 7/2005 | Yokota et al. |

FOREIGN PATENT DOCUMENTS

| DE | 295 07 628 U1 | 10/1995 |
| DE | 198 28 975 A1 | 12/1999 |
| EP | 0 965 489 A1 | 6/1999 |
| JP | 11-189119 | 7/1999 |
| WO | WO 2009/143984 A1 | 12/2009 |

OTHER PUBLICATIONS

International Search Report for International Application No. PCT/EP2009/004026, dated Sep. 15, 2009, mailed Sep. 24, 2009.

*Primary Examiner* — Eric Culbreth
(74) *Attorney, Agent, or Firm* — Brinks Hofer Gilson & Lione

(57) ABSTRACT

A vehicle assembly including a cover, for example, an airbag cover, having an attached plate of the type adapted to support a manufacturer's emblem, wherein the plate penetrates with tongues distributed over its circumference into perforations arranged at the vehicle assembly cover. The tongues are bent into matching slots molded on the back of the vehicle assembly cover about a bending edge arranged between the perforations and the slots. At least one of the tongues is provided at its free end with a narrower neck region and a cross-sectional enlargement extending through the perforations in the vehicle assembly cover, and the slots having a shape matching the contour of one or more of the tongue.

5 Claims, 2 Drawing Sheets

ADVANCED TAB LOCK ATTACHMENT FOR EMBLEM

CROSS-REFERENCE TO RELATED APPLICATIONS

This application claims priority to International Application No. PCT/EP2009/004026, filed Jun. 4, 2009, which is based on and claims priority to German Patent Application No. 10 2008 027 303.1, filed Jun. 7, 2008.

FIELD OF THE INVENTION

The present invention relates to a vehicle assembly for attaching a plate. More particularly, the invention relates to a cover having an attached plate to support for a manufacturer's emblem.

BACKGROUND OF THE INVENTION

A vehicle assembly, such as an airbag cover, may have an attached plate that penetrates with tongues, which are distributed over its circumference, into perforations arranged at the vehicle assembly. The tongues may be bent into matching molded slots on the back of the vehicle assembly about a bending edge, which is arranged between the perforations and the slots.

A vehicle assemble in the form of an airbag cover is described in JP 11-189119 A. Insofar as it is customary to attach a metal plate, in particular to the cover of an airbag arranged in the steering wheel of a motor vehicle, with the manufacturer's emblem on it, the cover known from JP 11-189119 A provides that oval tongues are configured at the metal plate which protrude at right angles from its outer edge. When the metal plate is attached to the steering wheel cover, these tongues are guided through slot-shaped perforations correspondingly configured thereon and bent on the back and/or inner side of the cover in contact with the cover. There are slots arranged on the back of the cover in order to lock the tongues after bending. The slots likewise have an oval shape, and as such, accordingly accommodate the free ends of the bent tongues therein. A corresponding bending edge is arranged between the perforations and the slots of the steering wheel cover.

A disadvantage associated with the known attachment is that the tongues may slip out and or be pulled out of the slots when sufficient force is exerted via the associated bending edge. Insofar as corresponding forces may appear in airbag covers when the airbag is released, this manner of attaching the metal plate to an airbag cover is not sufficiently reliable. In order to improve the reliability of the attachment of the metal plate, an additional protection of the bent tongues can be provided in this type of known attachment configuration. However, additional devices and processing steps are associated with this which are cost- and labor-intensive.

SUMMARY OF THE INVENTION

The present invention to provides a reliable and easily implemented attachment of a plate to a vehicle assembly.

In one form, the present invention provides that at least one tongue is provided at its free end with a narrower neck having a cross-sectional enlargement extending through the perforations in the vehicle assembly. Slots are configured at the vehicle assembly having a shape matching the contour of the tongue. The tongue forms a positive-locking connection with an associated slots after being bent into the slot, preventing the tongue from being pulled out of the slot because the cross-sectional enlargement of the tongue will not pass through the narrower neck region of the tongue adapted to the shape of the slot region and will accordingly interlock with the rear cutting edges of the slot. Additional securing measures of the bent tongue, like heat treatment or ultrasound welding, can therefore be omitted if desired.

The use of the present invention is not restricted to the attachment of metal or plastic plates on airbag covers; there are, in fact, corresponding attachment problems and requirements in other vehicle parts, such as radiator grills, wheel covers, etc.

According to one exemplary embodiment of the present invention, the individual tongue has a contour which is easy and cost-effective to produce, and the tongues may have an overall arrow-shaped contour with the narrower neck region and an arrowhead-like enlargement.

According to another exemplary embodiment of the present invention, the slot in the vehicle assembly may have a two-level configuration with an outer level for receiving the tongue which is bent about the bending edge in a first step, and a second level projecting inwardly attached thereto for accommodating the tongue pressed into the second level of the slot in a second step, whereby the narrower neck region of the tongue is molded to form a section corresponding to the distance between the first level of the slot and the second level of the slot. Apart from the positive locking configured between the tongue and the slot, the section molded in the narrower neck region of the tongue prevents the tongue from being pulled out of the slot because the molded section is shaped at an angle to the direction of force applied when trying to pull the tongue out of the slot, and the section would have to be deformed in order to release the tongue from the slot.

To the extent that shaping the section in the narrower neck region of the tongue will necessarily reduce its length, the second level of the slot may be offset radially from the first level of the slot in the direction of the bending edge by the amount of the reduction in length of the narrower neck region of the tongue in order to preserve the positive locking between the tongue and the associated slot.

BRIEF DESCRIPTION OF THE DRAWINGS

The drawings illustrate an exemplary embodiment of the present invention, which is described below, in which.

DETAILED DESCRIPTION OF THE PREFERRED EMBODIMENT

Figure 1:
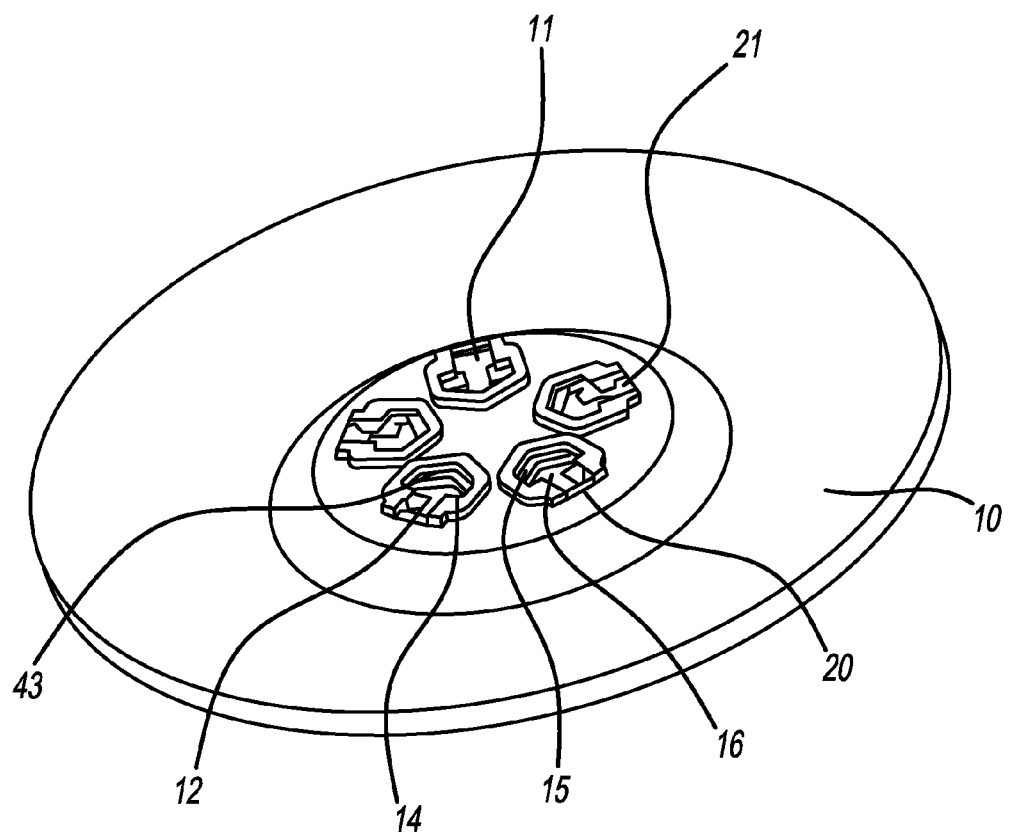
FIG. 1 is a rear perspective view of a vehicle assembly in the form of an airbag cover as the vehicle assembly supporting a metal plate with slots fitted thereon for accommodating of tongues, which are not shown, of the metal plate to be attached to the vehicle assembly.

Referring now to FIG. 1, slots 11 are configured at the rear side of an airbag cover 10, shown in top view as a vehicle assembly, for accommodating attachment tongues (not illustrated in FIG. 1) of a metal plate placed on the (front) side of the cover 10 facing away from the slots 11. In embodiments wherein the slots 11 are configured to match the contour of the tongues, which are not shown, then the discussion below about shaping the slots 11 also refers to the configuration of the tongues. In this respect, slots 11 and tongues are equally configured with an arrow-shaped contour which has a narrower neck region 12 and an arrowhead-like cross-sectional enlargement 13. Accordingly, rear cutting edges 14 are configured in the transition between the arrowhead-like cross-sectional enlargements 13 and the narrower neck regions 12 of the slots 11 with which the arrowhead-like cross-sectional enlargements 13 interlock when tensile load is applied in the longitudinal direction to the tongues and/or to the slots 11. Perforations 20 for inserting the tongues are configured at the outer radial end of the narrower neck regions 12, whereby a bending edge 21 is formed between the perforations 20 and the slots 12 about which the tongues inserted through the perforations 20 are bent.

The slots have a two-level configuration, with a first slot level 15 and a second slot level 16 projecting inwardly from there. With reference to FIG. 1, the second slot level 16 is radially offset from the first slot level 15 in the direction of the bending edge 21 by an amount explained below.

Figure 2:
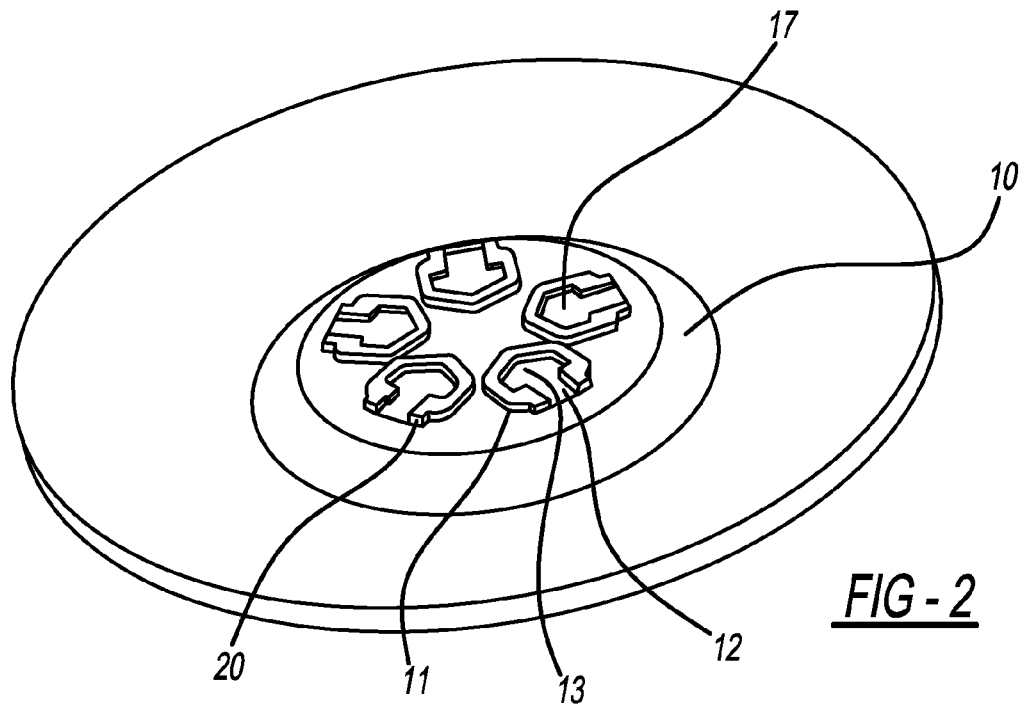
FIG. 2 is a rear perspective view of the airbag cover of FIG. 1 after inserting and bending the tongues of the metal plate into the first level of the slots configured at the airbag cover.

Referring now to FIG. 2, the tongues 17 inserted through the perforations 20 are bent in one step about the bending edge 21 and bent into the first slot level 15 configured to match the shape of the slot. The accommodation of the tongues 17 in the slots 11 adapted to the corresponding shape can be seen in FIG. 2, where the tongues 17 are accommodated in the first slot level 15.

Figure 3:
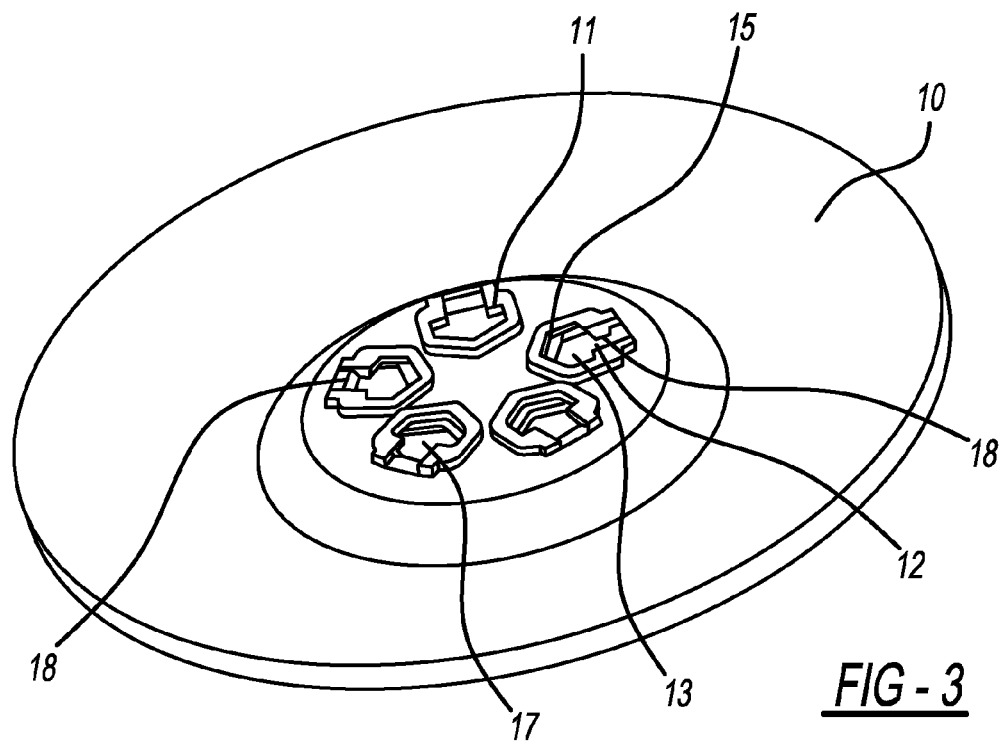
FIG. 3 is a rear perspective view of the airbag cover of FIGS. 1 and 2 after pressing the bent tongues into the second level of the slots.

Referring now to FIG. 3, the tongues 17 already bent into the first slot level 15 are again acted upon, for example, by means of a correspondingly provided tool, and pressed into the second slot level 16 of the slots 11 in a second step. In this second step, the narrower neck regions of the tongues 17 deform to a matching section 18 corresponding to the distance between the first slot level 15 and the second slot level 16. There is a reduction in the length by shaping the section 18 in the narrower neck region of the tongues 17, and the second slot level 16 is radially offset from the first slot level 15 by precisely the amount resulting from the reduction in length resulting from forming the section 18, so that even after pressing the tongues 17 into the second slot level 16, full positive locking between the tongues 17 and the slots 11 is attained.

The invention claimed is:

1. A vehicle assembly adapted to support a manufacturer's emblem, the vehicle assembly comprising:
   a cover forming a plurality of perforations therein; and
   a plate comprising a plurality of tongues distributed over its circumference, the tongues penetrating into the perforations, the tongues being bent into slots disposed on a back side of the cover about a bending edge arranged between the perforations and the slots, wherein at least one tongue of the plurality of tongues is provided at a free end with a neck region and a cross-sectional enlargement, the neck region being narrower than the cross-sectional enlargement, the at least one tongue extending through a perforation of the plurality of perforations in the cover, and the slots having a shape matching the contour of the at least one tongue,
   each slot of the plurality of slots having a two-level configuration including an outer first slot level for accommodating the at least one tongue bent about the bending edge, and a second slot level projecting inward from the bending edge for accommodating the at least one tongue pressed into the second level, wherein the neck region of the at least one tongue is molded to form a section corresponding to the distance between the first slot level and the second slot level.

2. The vehicle assembly according to claim 1, wherein the at least one tongue has an arrow-shaped contour and the cross-sectional enlargement has an arrowhead shape.

3. The vehicle assembly according to claim 1, wherein molding the at least one tongue results in a reduction in its length, and wherein the second slot level is radially offset from the first slot level in the direction of the bending edge by the amount resulting from the reduction in length of the tongue.

4. A vehicle assembly according to claim 1, wherein each tongue of the plurality of tongues has a neck region and a cross-sectional enlargement at a free end, the neck region being narrower than the cross-sectional enlargement.

5. The vehicle assembly according to claim 1, wherein the cover is an airbag cover configured to cover an airbag in a vehicle.

* * * * *